United States Patent
Peppler et al.

(10) Patent No.: US 6,547,029 B2
(45) Date of Patent: Apr. 15, 2003

(54) VEHICLE STEERING APPARATUS

(75) Inventors: Steven Peppler, West Lafayette, IN (US); William A. Szabela, Brookston, IN (US)

(73) Assignee: TRW Inc., Lyndhurst, OH (US)

( * ) Notice: Subject to any disclaimer, the term of this patent is extended or adjusted under 35 U.S.C. 154(b) by 0 days.

(21) Appl. No.: 09/950,066

(22) Filed: Sep. 10, 2001

(65) Prior Publication Data

US 2003/0047374 A1 Mar. 13, 2003

(51) Int. Cl.$^7$ .................................................. B62D 5/04
(52) U.S. Cl. ........................ 180/402; 180/443; 180/446
(58) Field of Search ................................. 180/443, 444, 180/446, 402; 318/268–271

(56) References Cited

U.S. PATENT DOCUMENTS

| | | | |
|---|---|---|---|
| 1,979,890 A | * | 11/1934 | Lee |
| 3,559,019 A | * | 1/1971 | Kato |
| 4,830,127 A | | 5/1989 | Ito et al. |
| 4,860,844 A | | 8/1989 | O'Neil |
| 4,865,144 A | | 9/1989 | North |
| 5,228,757 A | | 7/1993 | Ito et al. |
| 5,247,441 A | | 9/1993 | Serizawa et al. |
| 5,252,135 A | | 10/1993 | Serizawa et al. |
| 5,347,458 A | | 9/1994 | Serizawa et al. |
| 5,511,629 A | | 4/1996 | Vogel |
| 5,709,281 A | | 1/1998 | Sherwin et al. |
| 5,880,367 A | | 3/1999 | Vaughn |
| 5,925,083 A | | 7/1999 | Ackermann |
| 6,097,286 A | | 8/2000 | Discenzo |
| 6,098,296 A | | 8/2000 | Perisho, Jr. et al. |
| 6,397,971 B1 | * | 6/2002 | Kinfuku ..................... 180/443 |

FOREIGN PATENT DOCUMENTS

JP        64-60278    *  3/1989

* cited by examiner

Primary Examiner—Anne Marie Boehler
(74) Attorney, Agent, or Firm—Tarolli, Sundheim, Covell & Tummino L.L.P.

(57) ABSTRACT

A vehicle steering apparatus (10) includes a steering wheel motor (20) which is connected with a steering wheel (12) of a vehicle. The steering wheel motor (20) is energizable by electric current to resist rotation of the steering wheel (12). A variable resistor (60) is connected in parallel with the steering wheel motor (20) and is adjustable to vary the electric current which energizes the steering wheel motor. A road wheel steering motor (16) is connectable with steerable road engaging wheels of the vehicle. The road wheel steering motor (16) is energizable by electric current to effect turning movement of steerable road-engaging wheels in response to rotation of the steering wheel (12). The variable resistor (66) is connected in parallel with the road wheel steering motor (16) and is adjustable to vary electric current which energizes the road wheel steering motor.

4 Claims, 3 Drawing Sheets

VEHICLE STEERING APPARATUS

TECHNICAL FIELD

The present invention relates to a steering apparatus for a vehicle having a steering wheel and steerable road-engaging wheels.

BACKGROUND OF THE INVENTION

A known vehicle steering apparatus includes a steering wheel motor which is connectable with a steering wheel of a vehicle. The steering wheel motor is energizable by electric current to resist rotation of the steering wheel. A road wheel steering motor is connectable with steerable road engaging wheels. The road wheel steering motor is energizable by electric current to effect turning movement of steerable road-engaging wheels in response to rotation of the steering wheel.

It has previously been suggested that a variable resistor could be connected in parallel with the steering wheel motor. A steering apparatus having this construction is disclosed in International Patent Application Ser. No. PCT/US01/10566 filed Mar. 30, 2001 disclosing subject matter invented by Daniel E. Williams and assigned to TRW Inc. The aforementioned International Patent Application Ser. No. PCT/US01/10566 claims the benefit of U.S. Provisional Application Ser. No. 60/194,132 filed on Apr. 3, 2000. Another known steering apparatus is disclosed in International Patent Application Ser. No. PCT/US01/40392 filed Mar. 29, 2001 disclosing subject matter invented by William A. Szabela and assigned to TRW Inc. The aforementioned International Patent Application Ser. No. PCT/US01/40392 claims the benefit of U.S. Provisional Applications Ser. Nos. 60/194,134; 60/194,133; and 60/194,129 all filed on Apr. 3, 2000.

SUMMARY OF THE INVENTION

The present invention provides a new and improved steering apparatus for a vehicle having a steering wheel and steerable road-engaging wheels. The apparatus includes a steering wheel motor which is connectable with the vehicle steering wheel. The steering wheel motor is energizable by electrical current to resist rotation of the steering wheel. A variable resistor is connected in parallel with the steering wheel motor. The variable resistor is adjustable to vary the electric current which energizes the steering wheel motor.

A road wheel steering motor is connectable with steerable road-engaging wheels of the vehicle. The road wheel steering motor is energizable by electric current to effect turning movement of the steerable road-engaging wheels in response to rotation of the steering wheel. A variable resistor is connected in parallel with the road wheel steering motor. The variable resistor connected in parallel with the road wheel steering motor is adjustable to vary electrical current which energizes the road wheel steering motor.

A variable resistor may be connected in series with the steering wheel motor. Similarly, a variable resistor may be connected in series with the road wheel steering motor. The two resistors which are connected in series with the steering wheel motor and the road wheel steering motor limit electrical current conducted from the respective motors through the variable resistors which are connected in parallel with the motors.

BRIEF DESCRIPTION OF THE DRAWINGS

Further features and advantages of the present invention will be apparent to those skilled in the art to which the present invention relates from the following detailed description of preferred embodiments of the present invention made with reference to the accompanying drawings, in which.

DESCRIPTION OF PREFERRED EMBODIMENTS OF THE INVENTION

General Description

Figure 1:
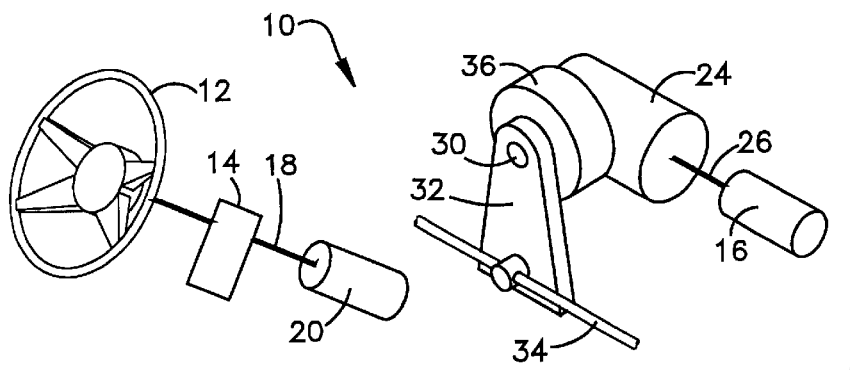
FIG. 1 is a schematic illustration of steering apparatus constructed in accordance with the present invention and illustrating the relationship between a steering wheel motor and a steering wheel and the relationship between a road wheel steering motor and apparatus for effecting steering movement of steerable road engaging wheels.

The present invention is embodied in a steering apparatus generally designated 10 in FIG. 1. The steering apparatus 10 includes a steering wheel 12 which is turned manually by the driver in the vehicle. A suitable steering wheel position sensor 14 senses the angular position of the steering wheel 12.

The steering wheel position sensor 14 provides an output signal dependent upon the amount of rotation of the steering wheel 12 and the angular position of the steering wheel. The output signal from the steering wheel position sensor 14 controls an electric road wheel steering motor 16. The steering wheel position sensor 14 may be any suitable known sensor. The road wheel steering motor 16 may be any suitable variable speed reversible electric motor.

Rotation of the steering wheel 12 (FIG. 1) causes rotation of a shaft 18 which is connected with the position sensor 14. The shaft 18 is connected with an electric steering wheel motor 20 which is constructed to resist turning of the shaft by the driver of the vehicle. The steering wheel motor 20 may be any suitable variable speed reversible electric motor.

The steering apparatus 10 is a steer-by-wire system. The steering apparatus 10 has no mechanical connection between the steering wheel 12 and a steering gear 24 which is operatively coupled with at least one steerable road-engaging wheel (not shown) on the end of a vehicle axle (not shown). The steering gear 24 may be of any suitable construction. The road wheel motor 16 is connected with the steering gear 24 by an input shaft 26.

The steering gear 24 (FIG. 1) is connected with the steerable road-engaging wheels of the vehicle by an output shaft 30 which is connected with a pitman arm 32. The pitman arm 32 is connected with the steerable vehicle wheels by a steering linkage 34. A road wheel position sensor 36 senses the output position of the steering gear 24 and, as a result, senses the position of the pitman arm 32 and steerable road-engaging wheels. The road wheel position sensor 36 is connected with the output shaft 30 from the steering gear 24. The road wheel position sensor 36 may be any suitable position sensor, including an optical sensor or an electrical sensor.

Upon rotation of the steering wheel 12, the steering wheel position sensor 14 provides an output signal to an electronic control unit 42 (FIG. 2) in control circuitry 43. The electronic control unit 42 then determines the desired road wheel position as a function of the position of the steering wheel 12. The electronic control unit 42 may include a variable ratio function which calculates the demanded road wheel position based on steering wheel position. The variable ratio function permits a non-linear relationship between road wheel position and steering wheel position. The variable ratio function in the electronic control unit 42 can use algorithms or lookup tables to perform the calculation of road wheel position. The electronic control unit 42 also receives a signal from the road wheel position sensor 36.

The electronic control unit 42 (FIG. 2) determines any errors between the position of the steering wheel and the position of the steerable road-engaging wheels of the vehicle. In response to detection of a difference between the position of the steering wheel 12 and the positions of road-engagable steerable vehicle wheels, the electronic control unit 42 actuates a motor drive circuit 44 to effect energization of the steering wheel motor 20 and the road wheel steering motor 16.

The electronic control unit 42 effects operation of the steering wheel motor 20 to resist rotation of the steering wheel 12 with a force which varies as a function of variations in the difference between the position of the steering wheel and the positions of the steerable road-engaging wheels of the vehicle. In addition, the electronic control unit 42 effects operation of the road wheel steering motor 16 to drive the steering gear 24 to actuate the steering linkage 34 and effect turning movement of the steerable road-engaging wheels of the vehicle to a position corresponding to the position of the steering wheel 12. A vehicle battery 48 provides power to effect operation of the steering wheel motor 20 and road-wheel steering motor 16.

The steering wheel motor 20 and road wheel steering motor 16 (FIG. 2) are preferably identical in construction and have motor windings connected in series. Therefore, the torque with which the steering wheel motor 20 resists rotation of the steering wheel 12 is the same as the torque which is applied by the road wheel steering motor 16 to the steering gear 24. Although the steering wheel motor 20 and road wheel steering motor 16 have the same output torque, the force which is transmitted from the road wheel steering motor 16 through the steering gear 24 and steering linkage 34 to the steerable road-engaging wheels of the vehicle is substantially greater than the force applied to the shaft 18 resisting rotation of the steering wheel 12.

The force which is applied to the shaft 18 resisting rotation of the steering wheel 12 varies as a function of variations in the force applied by the road wheel steering motor 16 to the input shaft 26 to the steering gear 24. Therefore, the force provided by the steering wheel motor 20 to resist rotation of the steering wheel 12 varies as a direct function of the force which is transmitted to the steerable road engaging wheels of the vehicle through the steering linkage 34. Of course, the force which effects turning movement of the steerable road-engaging vehicle wheels is greater than the force which resists turning movement of the steering wheel 12.

Since the force provided by the steering wheel motor 20 to resist rotation of the steering wheel 12 varies as a function of the force which is transmitted to the steerable vehicle wheels, the driver of the vehicle feels a resistance to turning movement of the steering wheel 12 which is a function of the resistance encountered by the steerable vehicle wheels to turning movement of the wheels. Thus, even though there is no mechanical connection between the steering wheel 12 and the steering gear 24, the torque applied by the steering wheel motor 20 to the steering wheel 12 makes the operator feel as though there is a mechanical connection between the steering wheel 12 and the steering gear 24.

Figure 2:
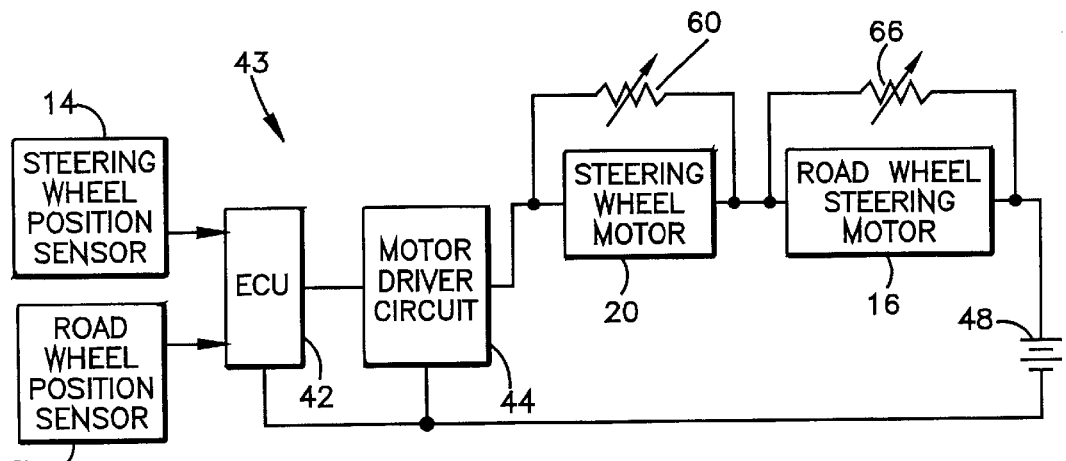
FIG. 2 is a schematic block diagram of an electrical circuit of the steering apparatus illustrated in FIG. 1.

It is contemplated that the control circuitry 43 of FIG. 2 could have many different constructions, it is believed that it may be desired to provide the electrical circuitry with the same construction as is disclosed in the aforementioned International Patent Application Ser. No. PCT/US01/10566 filed Mar. 30, 2001 disclosing subject matter invented by Daniel E. Williams and assigned to TRW Inc. As was previously mentioned, International Patent Application Ser. No. PCT/US01/10566 claims the benefit of U.S. Provisional Application Ser. No. 60/194,132 filed Apr. 3, 2000.

Variable Resistors

Figure 3:
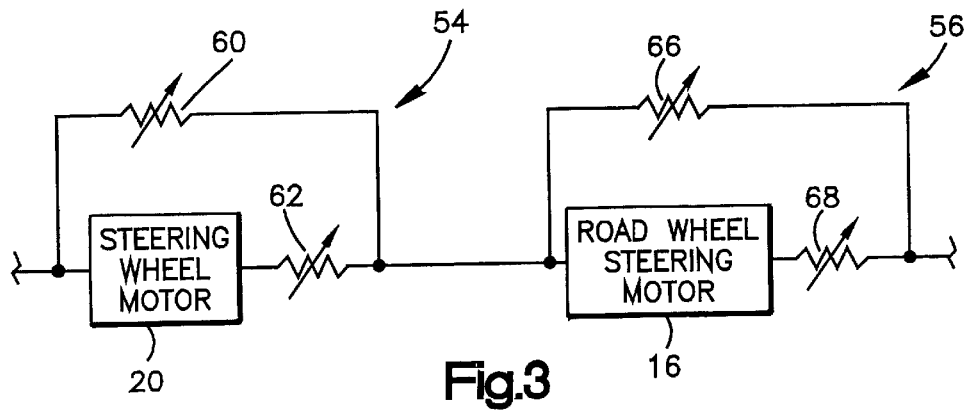
FIG. 3 is a schematic diagram of a portion of the circuit of FIG. 2 and illustrating the relationship of variable resistors to the steering wheel motor and road wheel steering motor in the apparatus of FIG. 1.

In accordance with one of the features of the present invention, variable resistors (FIG. 3) are provided in association with the steering wheel motor 20. The variable resistors 54 connected with the steering wheel motor 20 enable the output of the steering wheel motor to be varied to vary the resistance provided by the steering wheel motor to rotation of the steering wheel 12. By varying the resistance provided by the steering wheel motor 20 to rotation of the steering wheel 12, the effort required to turn the steering wheel and, therefore, the road feel, can be varied. The variable resistors 54 enables the output torque of the steering wheel motor 20 to be changed without changing the output torque of the road wheel steering motor 16.

Variable resistors 56 are connected with the road wheel steering motor 16. The variable resistors 56 enable the output of the road wheel steering motor 16 to be varied to vary the force transmitted to the steering gear 24. Varying the force transmitted to the steering gear 24 is effective to vary the force transmitted from the steering gear through the steering linkage 34 to the steerable road-engaging wheels of the vehicle. By varying the force transmitted to the steerable road-engaging wheels of vehicle in response to rotation of the steering wheel 12, the amount of assistance provided by the road wheel steering motor 16 and steering gear 24 to incremental rotation of the steering wheel 12 can be varied. The variable resistors 56 enable the output torque of the road wheel steering motor 16 to be changed without changing the output torque of the steering wheel motor 20.

It is contemplated that the variable resistors 54 and 56 (FIG. 3) will be set when the steering apparatus 10 is installed in the vehicle. However, if desired, controls could be provided in the vehicle to enable an operator to vary the settings of the variable resistors 54 and 56 if desired. Alternatively, controls could be provided at a relatively inaccessible location in the vehicle to enable maintenance personnel to vary the settings of the resistors 54 and 56 if desired.

The variable resistors 54 connected with the steering wheel motor 20 include a variable resistor 60 connected in parallel with the steering wheel motor 20 and a variable resistor 62 connected in series with the steering wheel motor 20. Similarly, the variable resistors 56 connected with the road wheel steering motor 16 include a variable resistor 66 connected in parallel with the road wheel steering motor 16. A variable resistor 68 is connected in series with the road wheel steering motor 16.

The variable resistors 60 and 66 (FIG. 3) are adjustable to change the amount of current which is bypassed around the steering wheel motor 20 and road wheel steering motor 16. Changing the amount of current which is bypassed around the steering wheel motor 20 and the road wheel steering motor 16 is effective to vary the output torque of the steering wheel motor and the road wheel steering motor. Adjusting the variable resistor 60 to adjust the current conducted through the steering wheel motor 20 does not change the current conducted through the road wheel steering motor 16. Similarly, adjusting the variable resistor 66 to adjust the current conducted through the road wheel steering motor 16 does not change the current conducted through the steering wheel motor 20.

When the output torque of the steering wheel motor 20 is to be adjusted, the variable resistor 60 is adjusted. By increasing the resistance of the variable resistor 60, the amount of current which is conducted from the motor driver circuit 44 through the steering wheel motor 20 is increased. Of course, increasing the current conducted through the steering wheel motor 20 increases the output torque of the motor and the resistance to rotation of the steering wheel 12. Conversely, decreasing the resistance of the variable resistor 60 is effective to decrease the amount of current which is conducted through the steering wheel motor 20. Decreasing the amount of current which is conducted through the steering wheel motor 20 decreases both the output torque of the motor and the amount of resistance to rotation of the steering wheel 12. The variable resistor 62 is adjustable to limit recirculation of current from the steering wheel motor 20 through the variable resistor 60.

By increasing the resistance of the variable resistor 66, the amount of current conducted through the road wheel steering motor 16 is increased. Increasing the amount of current conducted through the road wheel steering motor 16 increases the output torque transmitted from the road wheel steering motor 16 to the steering gear 24 (FIG. 1). Decreasing the resistance of the variable resistor 66 (FIG. 3) increases the current which bypasses the road wheel steering motor 16. Increasing the current which bypasses the road wheel steering motor 16 decreases the output torque transmitted from the road wheel steering motor 16 to the steering gear 24 (FIG. 1).

Steering Gear—First Embodiment

The steering gear 24 (FIG. 1) is operated in response to operation of the steering wheel motor 16 to drive the steering linkage 34. It is contemplated that the steering gear 24 could have any one of many different constructions. In the embodiment of the invention illustrated in FIG. 4, the steering gear 24 is an integral hydraulic power steering gear.

The integral hydraulic power steering gear 24 includes a two-piece housing 82 (FIG. 2) having a hydraulic power cylinder 84. The power cylinder 84 comprises a chamber 86 divided into two chamber portions 88 and 90, respectively, by a piston 92. The piston 92 includes an inner bore 93 with a helical groove 94. The piston 92 also has a set of external teeth 95 which mesh with a sector gear 96. The sector gear 96 is fixed to an output shaft 30 which extends outwardly from the housing 82. The output shaft 30 is connected to a pitman arm 32 (FIG. 1) which, in turn, is connected via steering linkage 34 to the steerable wheels to steer the vehicle. As the piston 92 moves in the chamber 86, the output shaft 30 is rotated to operate the steering linkage 34, which turns the steerable wheels of the vehicle.

A hydraulic control valve assembly 100 (FIG. 2) controls the flow of pressurized hydraulic fluid between a hydraulic circuit including a hydraulic pump (not shown) and one of the chamber portions 88 and 90 to control the direction and amount of steering. The valve assembly 100 is actuated by a rotatable input shaft 26. The input shaft 26 (FIGS. 1 and 4) is rotated by the electric motor 16.

The valve assembly 100 (FIG. 4) comprises first and second valve members 104 and 106, respectively. The first valve member 104 comprises a valve core 110 and the second valve member 106 comprises a valve sleeve 112. The valve core 110 is located coaxially within the valve sleeve 112 and is supported for rotation by the valve sleeve. The valve core 110 is formed integrally as one piece with the input shaft 26. The valve core 110 has oppositely disposed first and second end portions 114 and 116, respectively, and a valve section 118 between the end portions. The first end portion 114 of the valve core 110 projects beyond the valve sleeve 112 and the second end portion 116 of the valve core lies within the valve sleeve.

The valve section 118 of the valve core 110 has a plurality of circumferentially spaced, axially extending grooves 120 as is known in the art. A first portion of the grooves 120 are fluidly connected with an internal passage 122 extending from the valve section 118 of the valve core 110 to the second end portion 116. The internal passage 122 communicates via passages (not shown) with the return line of a hydraulic pump circuit (not shown). A second portion of the grooves 120 are in fluid communication with a plurality of passages 124 in the valve sleeve 112.

The valve sleeve 112 has oppositely disposed first and second ends 130 and 132, respectively. The valve sleeve 112 further includes a sleeve section 134 adjacent the first end 130 and a ball screw section 136 adjacent the second end 132. An axially extending passage 138 extends from the first end 130 of the valve sleeve 112 through the sleeve section 134 and the ball screw section 136 to the second end 132.

The first end 130 of the valve sleeve 112 includes first and second lugs (not shown) that are disposed in diametrically opposed cut-outs (not shown) in the valve core 110. Upon rotation of the valve core 110 of between 2° and 8° relative to the valve sleeve 112, the lugs engage the cut-outs in the valve core to cause the valve sleeve to be rotated along with the valve core. Such rotation of the valve sleeve 112 causes the piston 92 to move axially in the chamber 86 and, hence, allows for manual steering of the vehicle even if a loss in hydraulic fluid pressure has occurred.

The sleeve section 134 (FIG. 4) of the valve sleeve 112 includes the plurality of passages 124 which extend from the outer circumference of the sleeve section to the inner circumference. The passages 124 communicate with an annular chamber 140 in the housing 82 which is fluidly connected to the hydraulic pump. A plurality of axially extending grooves 142 are formed in the inner surface of the valve sleeve 112 as is known in the art. The grooves 142 fluidly communicate with the second portion of the grooves 120 in the valve core 110. Further, a first portion of the grooves 142 in the valve sleeve 112 are fluidly connected via passages (not shown) with the first chamber portion 88 in the housing 82, and a second portion of the grooves 142 fluidly connected via passages (not shown) with the second chamber portion 90 in the housing. As is known in the art, when the valve core 110 is rotated relative to the valve sleeve 112, hydraulic fluid is ported through the grooves 120 and 142 and associated passages to one of the chamber portions 80 and 90, while the hydraulic fluid is vented from the other chamber portion, thereby causing the piston 92 to move accordingly.

The ball screw section 136 (FIG. 4) of the valve sleeve 112 includes a helical groove 144 formed on its outer periphery. A plurality of balls 146 are located in the helical groove 144. The balls 146 are also located in the helical groove 94 in the bore 93 formed in the piston 92. As is well known in the art, axial movement of the piston 92 causes the ball screw portion 136 to rotate which, in turn, causes the rest of the valve sleeve 112 to rotate.

A torsion bar 148 connects the valve core 110 and the valve sleeve 112. One end of the torsion bar 148 is connected by a pin 150 to the valve section 118 of the valve core 110, while the other end of the torsion bar extends through the passage 138 in the valve sleeve 112 and is connected by a pin 152 adjacent the second end 132 of the valve sleeve.

From the above description it should be apparent that actuation of the motor 16 causes rotation of the valve core 110 of the steering gear 24 relative to the valve sleeve 112. Rotation of the valve core 112 causes axial movement of the piston 92 in one direction or the other. Axial movement of the piston 92 results in rotation of the sector gear 96 and the pitman arm 32, thereby causing the road-engaging steerable wheels to turn laterally of the vehicle.

Steering Gear—Second Embodiment

Figure 4:
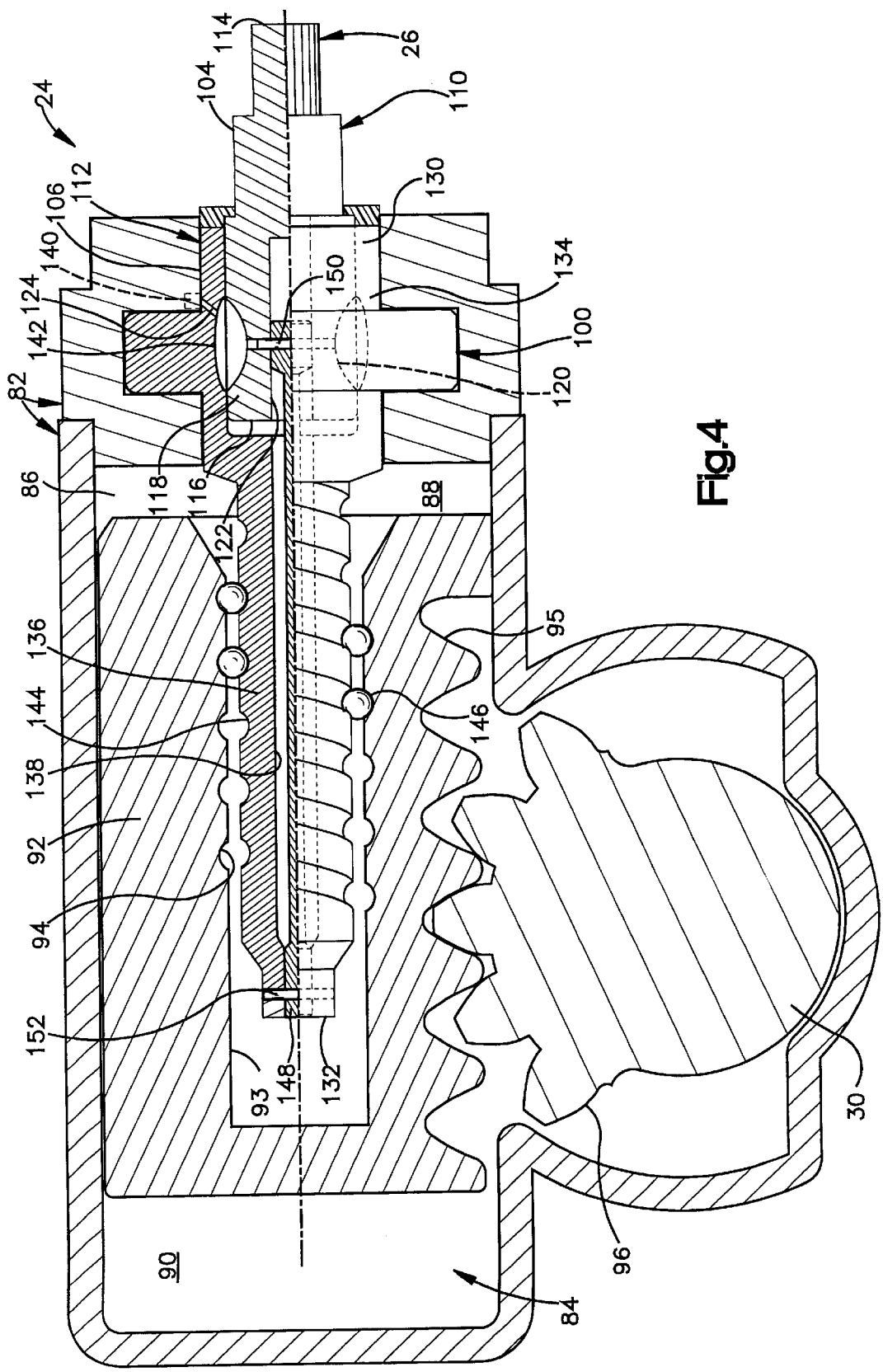
FIG. 4 is a cross-sectional view of a hydraulic motor which is connected with the road wheel steering motor and with the steerable vehicle wheels.

In the embodiment of the steering gear 24 illustrated in FIG. 4, the steering gear includes a hydraulically actuated motor which drives a sector gear 96. In the embodiment of the invention illustrated in FIG. 5, the road wheel steering motor 16 is connected directly with the steering gear 24. The steering gear 24 is, in turn, connected directly to the steering linkage 34 (FIG. 1). Rather than being hydraulically actuated, like the steering gear 24 of FIG. 4, the steering gear 24 of FIG. 5 utilizes mechanical devices to effect a multiplication of the force provided by the road wheel steering motor 16 to drive the steering linkage 34 and effect turning movement of the steerable road-engaging vehicle wheels.

The steering gear 24 includes a linearly movable steering member 232 (FIG. 5) that extends axially through a housing 231. The steering member 232 is linearly (or axially) movable along an axis 234. The steering member 232 includes a screw portion 240 having an external thread convolution. The steering member 232 is connected with tie rods 242 which form part of the steering linkage 34 (FIG. 1). The steering linkage 34 is connected with the steerable wheels (not shown) of the vehicle through the tie rods 242 (FIG. 5) located at the distal ends of the steering member 232. Linear movement of the steering member 232 along the axis 234 results in steering movement of the steerable wheels as is known in the art.

The housing 231 has a generally cylindrical configuration including an axially extending side wall 250 centered on the axis 234. A radially enlarged section 252 of the housing 231 is located at the right end (as viewed in FIG. 5) of the housing 231. The radially enlarged section 252 of the housing 231 defines an annular chamber 254. An outboard housing 258 is attached, in a manner not shown, to the radially enlarged section 252 of the housing 231 and closes the chamber 254.

A ball nut assembly 270 is located in the chamber 254 in the radially enlarged section 252 of the housing 231 and encircles the screw portion 240 of the steering member 232. The ball nut assembly 270 includes a ball nut 272, a plurality of force transmitting members or balls 274, a first bearing assembly 276, a gear member 278, and a lock nut 280. The lock nut 280 screws onto the ball nut 272 to axially secure the parts of the ball nut assembly 270.

The plurality of force-transmitting members 274 comprise balls disposed between the internal screw thread convolution of the ball nut 272 and the external thread convolution on the screw portion 240 of the steering member 232. The ball nut assembly 270 includes a recirculation passage (not shown) for recirculating the balls upon axial movement of the steering member 232 relative to the ball nut assembly. The ball nut assembly 270 provides a gear reduction ratio as is known in the art.

The road wheel steering motor 16 is mounted to a radially extending gearbox portion 222 of the housing 231. The gearbox portion 222 extends from the radially enlarged section 252 of the housing 231. The gearbox portion 222 contains meshed first and second gears 278 and 224, respectively. The first gear is the gear member 278 of the ball nut assembly 270. The second gear 226 is connected for rotation with the motor output shaft 203 extending from the road wheel steering motor 16. The meshed first and second gears 278 and 226 provide a gear reduction ratio between the motor output shaft 203 of the electric motor 16 and the ball nut assembly 270. When the gear reduction ratio of the ball nut assembly 270 is combined with the gear reduction ratio of the gears 226 and 278, an overall gear reduction ratio for the steering gear 24 is provided.

In the illustrated embodiment of the invention, the motor 16 extends transverse to the steering member 232 at a right angle. It is contemplated, however, that the motor 16 could lie parallel to the steering member 232 or at a different angle, such as 450, relative to the steering member.

Figure 5:
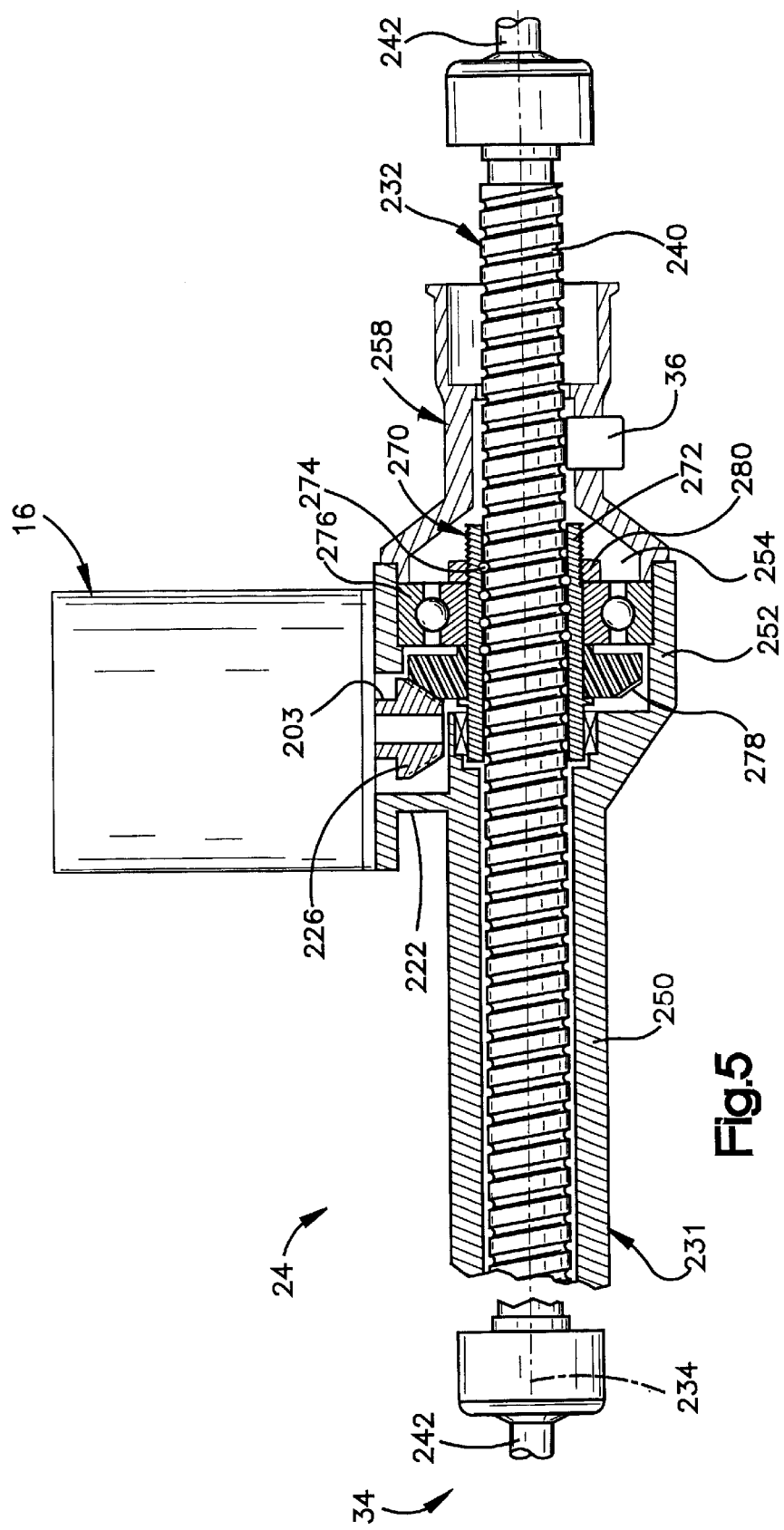
FIG. 5 is a sectional view of an alternative embodiment of the apparatus of FIG. 1 and illustrating the relationship of the road wheel steering motor to a drive mechanism connected with steerable road-engaging wheels of a vehicle.

The steering gear 24 further includes a plurality of output position sensors 36, illustrated schematically in FIG. 5, for sensing the amount of rotation of the ball nut 270. The position sensors 36 are non-contacting sensors. There are a multiplicity of output position sensors 36 for redundancy purposes. The electronic control unit 42 is operable to generate a signal corresponding to the rotation of the ball nut 270 sensed by the position sensors 36.

The steering gear 24 has a construction which is generally similar to the construction of the steering gear disclosed in the aforementioned International Patent Application Ser. No. PCT/US01/40392 filed Mar. 29, 2001 assigned to TRW Inc. and containing subject matter invented by William A. Szabela. Although one specific form of steering gear 24 has been illustrated in FIG. 5 and a different form of the steering gear has been illustrated in FIG. 4, it is contemplated that the steering gear could have a construction which is different than either of these two exemplary constructions.

From the above description of the invention, those skilled in the art will perceive improvements, changes and modifications. Such improvements, changes and modifications within the skill of the art are intended to be covered by the appended claims.

Having described the invention, the following is claimed:

1. A steering apparatus for a vehicle having a steering wheel and steerable road-engaging wheels, said apparatus comprising:

a first electric motor connectable with the steering wheel, said first electric motor being energizable by electric current to resist rotation of the steering wheel;

a first variable resistor connected in parallel with said first electric motor, said first variable resistor being adjustable to vary the electric current which energizes said first electric motor;

a second electric motor connectable with the steerable road-engaging wheels, said second electric motor being energizable by electric current to effect turning movement of the steerable road-engaging wheels in response to rotation of the steering wheel; and a second variable resistor connected in parallel with said second electric motor, said second variable resistor being adjustable to vary electric current which energizes said second electric motor.

2. A steering apparatus for a vehicle having a steering wheel and steerable road-engaging wheels, said apparatus comprising:

a first electric motor connectable with the steering wheel, said first electric motor being energizable by electric current to resist rotation of the steering wheel;

a first variable resistor connected in parallel with said first electric motor, said first variable resistor being adjustable to vary the electric current which energizes said first electric motor;

a second electric motor connectable with the steerable road-engaging wheels, said second electric motor being energizable by electric current to effect turning movement of the steerable road-engaging wheels in response to rotation of the steering wheel;

a second variable resistor connected in parallel with said second electric motor, said second variable resistor being adjustable to vary electric current which energizes said second electric motor; and a third variable resistor connected in series with said first electric motor and in parallel with said first variable resistor to limit electrical current conducted from said first electric motor through said first variable resistor; and a fourth variable resistor connected in series with said second electric motor and in parallel with said second variable resistor to limit electrical current conducted from said second electric motor through said second variable resistor.

3. A steering apparatus for a vehicle having a steering wheel and steerable road-engaging wheels, said apparatus comprising:

a first electric motor connectable with the steering wheel, said first electric motor being energizable by electric current to resist rotation of the steering wheel;

a first variable resistor connected in parallel with said first electric motor, said first variable resistor being adjustable to vary the electric current which energizes said first electric motor;

a second electric motor connectable with the steerable road-engaging wheels, said second electric motor being energizable by electric current to effect turning movement of the steerable road-engaging wheels in response to rotation of the steering wheel; and a second variable resistor connected in parallel with said second electric motor, said second variable resistor being adjustable to vary electric current which energizes said second electric motor, wherein said first electric motor and said first variable resistor are connected in series with said second electric motor and said second variable resistor.

4. A steering apparatus for a vehicle having a steering wheel and steerable road-engaging wheels, said apparatus comprising:

a first electric motor connectable with the steering wheel, said first electric motor being energizable by electric current to resist rotation of the steering wheel;

a first variable resistor connected in parallel with said first electric motor, said first variable resistor being adjustable to vary the electric current which energizes said first electric motor;

a second electric motor connectable with the steerable road-engaging wheels, said second electric motor being energizable by electric current to effect turning movement of the steerable road-engaging wheels in response to rotation of the steering wheel;

a second variable resistor connected in parallel with said second electric motor, said second variable resistor being adjustable to vary electric current which energizes said second electric motor; and a third variable resistor connected in parallel with said first variable resistor and in series with said first electric motor, said first electric motor and said third variable resistor being connected in series with said second electric motor and said second variable resistor.

* * * * *